INVENTOR
NORMAN L. HARVEY
BY John A. Harvey
ATTORNEY

VISUAL DISPLAY DEVICE

Filed Aug. 28, 1952

INVENTOR
NORMAN L. HARVEY
BY John A. Harvey
ATTORNEY

Jan. 30, 1968 N. L. HARVEY 3,366,836

VISUAL DISPLAY DEVICE

Filed Aug. 28, 1952 3 Sheets-Sheet 3

INVENTOR
NORMAN L. HARVEY
BY John A. Harvey
ATTORNEY

United States Patent Office 3,366,836
Patented Jan. 30, 1968

3,366,836
VISUAL DISPLAY DEVICE
Norman L. Harvey, Eggertsville, N.Y., assignor, by mesne assignments, to Sylvania Electric Products Inc., Wilmington, Del., a corporation of Delaware
Filed Aug. 28, 1952, Ser. No. 306,909
26 Claims. (Cl. 315—169)

The present invention relates to visual display devices, and particularly to devices capable of reproducing either stationary or animated images. While the invention is of general utility, it has particular utility as the image reproducing device in a television receiver and will be described in that connection.

Television receivers conventionally employ a cathode-ray tube so operated that the electron beam of the tube is modulated in intensity and at the same time is scanned under the influence of electric or magnetic fields in a raster of parallel lines thereby to reproduce a received image on the fluorescent screen of the tube. This type of image reproducing device as conventionally constructed requires large physical dimensions and, by virtue of its evacuation and the resultant air pressure which the walls of the tube are required to withstand, becomes increasingly bulky and heavy as the size of the image reproducing area is increased. The larger sizes of such tubes are not only relatively expensive to manufacture but are hazardous to handle and require relatively large and expensive enclosing cabinet structures. There has been a long felt need for a non-evacuated image reproducing device which would have physical dimensions related only to the image reproducing area desired and no appreciable thickness, much like a sheet of glass. Such a device could be more readily handled, transported and mounted in a television cabinet and would substantially reduce the size and expense of cabinets heretofore required for conventional types of image reproducing devices.

It is an object of the present invention to provide a new and improved visual display device which is of simple and relatively inexpensive construction and one occupying minimum physical bulk.

It is a further object of the invention to provide a novel visual display device requiring relatively low operating potentials, one which does not require evacuation and further is not subject to many of the limitations inherent in conventional present day cathode-ray tubes.

It is another object of the invention to provide a visual display device having relatively high efficiency and thus one which minimizes the electrical power required in its operation.

It is an additional object of the invention to provide a novel visual display device which avoids many of the disadvantages and limitations of prior such devices, and one characterized by a wide range of applications.

For a better understanding of the present invention, together with other and further objects thereof, reference is had to the following description taken in connection with the accompanying drawings, and its scope will be pointed out in the appended claims.

Referring now to the drawings:

FIG. 1 illustrates a visual display device, partially broken away to illustrate its construction, embodying the present invention in a particular form;

FIG. 2 graphically illustrates certain operating characteristics of the display device;

Figure 6:
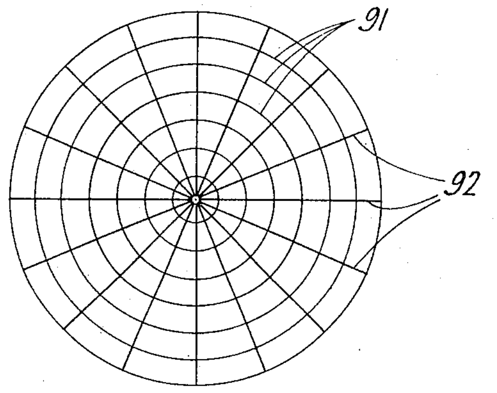
Figure 7:
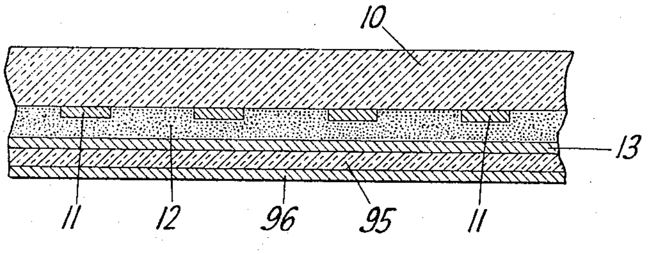

FIG. 6 diagrammatically represents a modified form of display device embodying the invention; and FIG. 7 illustrates in cross section an additionally modified form of display device embodying the invention.

Figure 1:
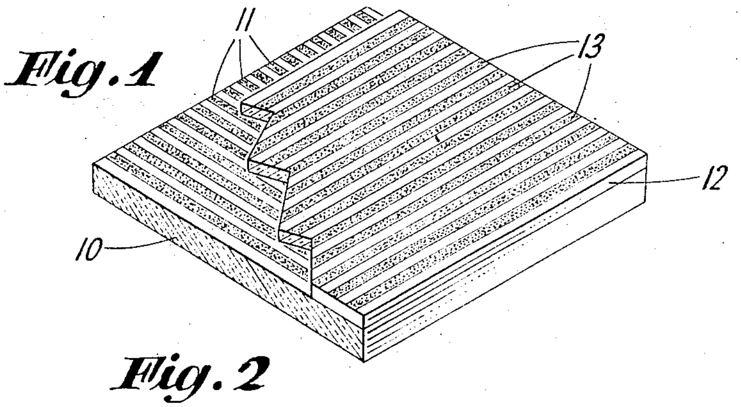

Referring now more particularly to FIG. 1, a display device embodying the invention is conveniently constructed as a laminar structure supported on a rigid transparent member 10 such as a sheet of glass. Formed on one surface of the member 10 is a first array of light-transmitting electrically-conductive electrically-individually elements 11 arranged as a grid structure of spaced parallel conductive strips. The elements 11 may be formed in numerous ways well-known in the art, for example by exposing the heated member 10 through a suitable slotted or apertured mask to vapors of silicon, tin or titanium chlorides and thereafter placing the member 10 in a slightly reducing atmosphere. In some cases, stannic chloride may be mixed with absolute alcohol and glacial acetic acid and this solution may then be painted or ruled on the surface of the member 10 to form the elements 11 or may be sprayed thereon through a suitable apertured mask. Alternatively, the elements 11 may be formed of silver by deposition from a suitable solution.

A layer of electric-field-responsive light-emitting phosphor 12 is placed over the array of elements 11 and in contact therewith. The phosphor layer 12 may be any material which exhibits fluorescence or phosphorescence under the influence of an electric field, and may have a composition and be formed and applied in the manner disclosed and claimed in any of the following co-pending applications or patents which are assigned to the same assignee as the present application. Ser. No. 105,794, filed July 20, 1949, entitled, "Electro-Luminescent Lamp," in the name of Eric L. Mager et al.; Ser. No. 105,803 filed July 20, 1949, entitled, "Electro-Luminescent Lamp," in the name of Elmer C. Payne; Ser. No. 119,021, filed Sept. 30, 1949, entitled, "Electro-Luminescent Phosphor," in the name of Elmer C. Payne; Ser. No. 119,022, filed Sept. 30, 1949, entitled, "Electro-Luminescent Phosphor," in the name of Elmer C. Payne; Ser. No. 120,398, filed Oct. 8, 1949, entitled, "Electro-Luminescent Lamp," in the name of Eric L. Mager; Ser. No. 180,783, filed Aug. 22, 1950, entitled, "Electro-Luminescent Lamp," in the name of Elmer C. Payne; Ser. No. 180,785, filed Aug. 22, 1950, entitled, "Electro-Luminescent Lamp," in the name of Eric L. Mager; and United States Patent No. 2,566,-349 granted Sept. 4, 1951 to Eric L. Mager.

One example of a suitable phosphor 12 is a copper-activated zinc sulfide, in the form of fine particles imbedded in plasticized nitro-cellulose having the following composition:

| | |
|---|---|
| Phosphor ----------g-- | 10 |
| Sodium bicarbonate ----------g-- | 2 |
| Nitrocellulose (quarter-second viscosity) ----------g-- | 8 |
| Castor oil ----------g-- | 1 |
| Orthonitrodiphenyl ----------g-- | 3 |
| Di-octyl sebacate ----------g-- | 1 |
| Chlorinated diphenyl ----------g-- | 2 |
| Di-octyl phthalate ----------g-- | 1 |
| Benzophenone ----------g-- | 2 |
| Methyl acetyl ricinoleate ----------g-- | 2 |
| Cellosolve ricinoleate ----------g-- | 2 |
| Glyceryl tri-aceto ricinoleate ----------g-- | 3 |
| Butyl acetate ----------cc-- | 85 |

The visual display device of the invention includes a second array of electrically-conductive electrically-individual elements 13 in the form of a grid structure of linear spaced conductive strips. The elements 13 are oriented normal to the elements 11 and may be conveniently coated onto the phosphor layer 12 by various methods, for example by vacuum deposition which has the advantage of insuring intimate contact of the elements 13 with the phosphor layer 12 and of excluding occluded gas which might otherwise be trapped between the elements and the phosphor layer. The material of the elements 13 may be aluminum, chromium or even stainless steel which are good reflectors of light and thus provide a mirror surface for reflecting light produced by the device through the front glass plate 10. A suitable vacuum apparatus and technique for forming the elements 13 is disclosed in United States Patent No. 2,123,706, granted July 12, 1938, to O. H. Biggs. Any suitable mask or other arrangement may be used for masking the surface portions of the phosphor layer 12 for preventing ultimate deposition of conductive material in the spaces between the elements 13, or these spaces may be coated by a material which is dissolved out after the vacuum deposition step to remove the conductive material from the spaces between the elements 13.

Electrical connection to the ends of the elements 11 may conveniently be made by leaving these ends exposed along one edge of the member 10; that is, by terminating the phosphor layer 12 a short distance from one edge of the member 10 at the time the layer 12 is placed upon the plate 10 and elements 11.

The elements 11 and 13 are not drawn to scale in FIG. 1, but rather have been widened for purposes of clarity. In practice these elements will normally be rather fine lines spaced by approximately a line width, depending of course upon the application to which the display device is put.

Figures 2, 3:
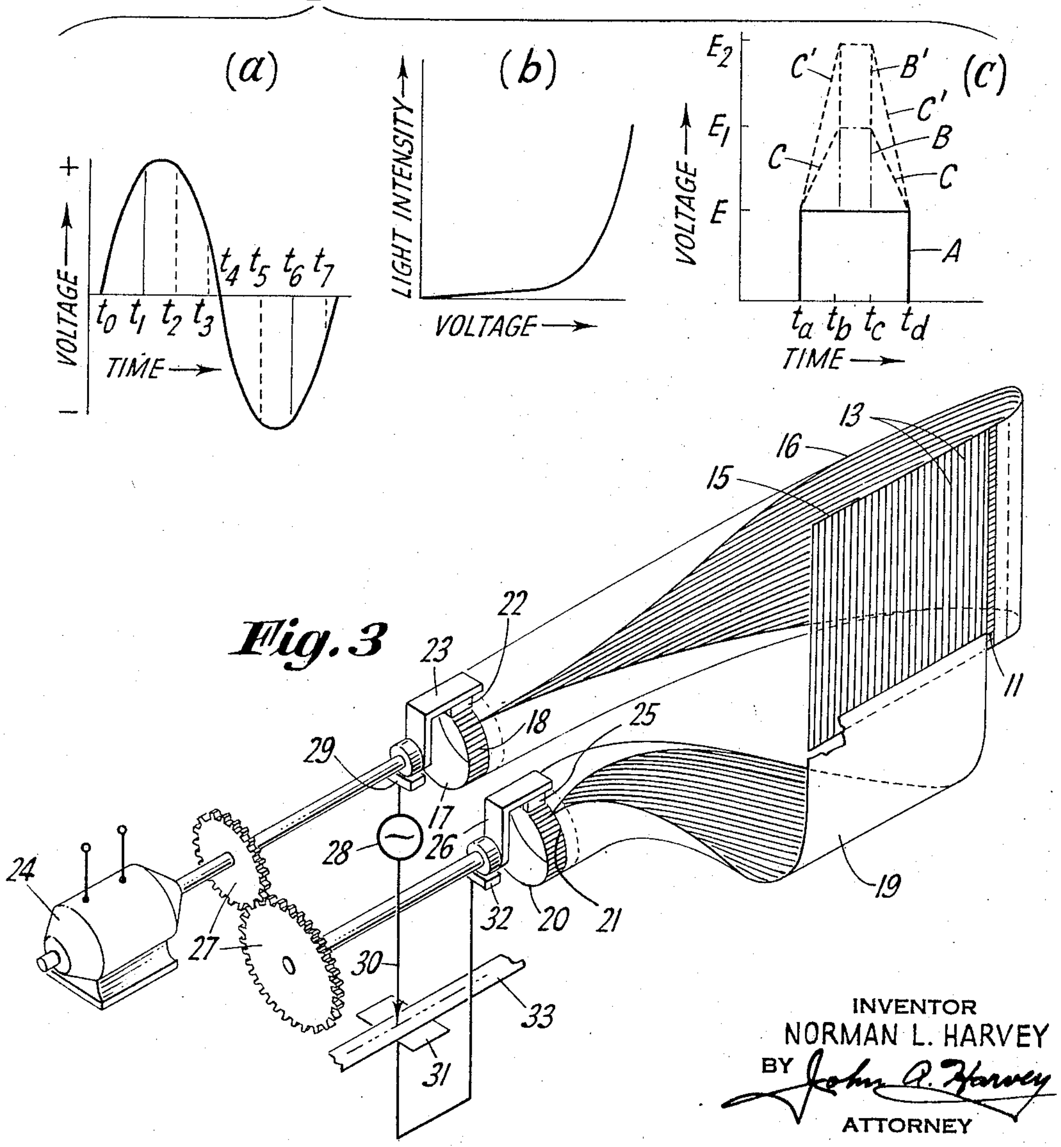
FIG. 3 represents a simplified form of display arrangement utilizing a display device embodying the invention.

Considering now the operation of the visual display device described, and referring to the curves of FIG. 2, an alternating voltage (or voltage having any wave form which changes amplitude with time) is applied between any selected one of the elements 11 and any selected one of the elements 13 to produce across the phosphor layer 12 an electric field in the region where the selected elements 11 and 13 cross. The phosphor layer 12 responds to the changing electric field produced by the alternating voltage to emit light at the crossover point of the selected elements 11 and 13. This light emission is by fluorescence or phosphorescence of the phosphor layer 12 and occurs during each interval when the exciting voltage is either increasing in amplitude or decreasing in amplitude with either positive or negative potential. Thus in FIG. 2*a*, substantial light output is produced during the time intervals $t_0$–$t_1$, $t_2$–$t_3$, $t_4$–$t_5$ and $t_6$–$t_7$ of each cycle of a sinusoidal excitation voltage.

As indicated in FIG. 2*b*, the light output intensity is not uniform with maximum amplitude of the exciting voltage but rather increases slowly up to a certain threshold region and thereafter increases rapidly with increasing amplitudes of the exciting voltage. Actually, the output light intensity is found to vary with the rate of change of the electric field produced across the phosphor layer 12. The importance of this may be made more apparent by assuming that there is applied between the selected one of the elements 11 and 13 a voltage of rectangular wave form. For example, and referring to FIG. 2*c*, assume that the applied voltage is of rectangular wave form having the amplitude E as represented by solid-line curve A. Suppose that the amplitude E is just below the threshold region represented by the nearly horizontal portion of the curve of FIG. 2*b* where the phosphor layer develops small output even though the leading and lagging edges of the applied voltage change rapidly with time. This voltage of amplitude E may be considered a threshold bias voltage, and assume that there is superimposed upon this voltage a second pulse voltage having a pulse wave form represented by broken-line curve B. The two voltages together have a combined amplitude of $E_1$, and the light output of the device during the time interval $t_a$–$t_b$ and $t_c$–$t_d$ is proportional to the rate of change of the combined voltages from the amplitude E to the amplitude $E_1$ as represented by broken-line curve C. Thus the light output will now be substantial since the device is operating on the steeper slope of its light-output intensity characteristic (FIG. 2*b*). If the second pulse voltage is now increased in amplitude to provide a combined amplitude $E_2$ as represented by the dotted curve B′, the light output of the device is further increased since the rate of change of the applied voltages is greater as represented by curve C′. Thus it will be apparent that a visual display device embodying the invention is capable of having its light intensity modulated, for example by an electrical image signal.

By applying the exciting voltages to the elements 11 in succession at a first rate of change from element to element while maintaining the voltage on one of the elements 13, it will be apparent that the electric field developed across the phosphor layer 12 moves along the length of the energized element 13 thus causing a spot of light produced by the device similarly to move along the latter element. By likewise applying the exciting voltage to the elements 13 in succession at a different rate than last mentioned, the spot of light produced by the device not only moves or scans along each element 13 but also scans from an element 13 on one side of the device to one on the opposite side of the device thus causing the reproduced light spot to trace a raster of parallel lines in succession as in a conventional cathode-ray type of television image reproducing device.

An arrangement of the type last mentioned is shown in FIG. 3 wherein a visual display device 15 of the FIG. 1 type is utilized in an animated image display arrangement. A sheet of flexible insulating material 16 has printed or otherwise formed on one surface thereof a raster of ribbon conductors having the same number and spacing as the conductive elements 11 of the plate 15. One end of this sheet 16 is clamped flat against the exposed ends of the elements 11 so that the elements 11 are in registry with and electrically engage the ribbon conductors formed on the sheet 16. The other end of the sheet 16 is wrapped around and clamped to a commutator drum 17 which has conductive bars 18 formed on the peripheral surface thereof of the same number and spacing as the conductive ribbons on the sheet 16 by which each of the conductive elements 11 is electrically connected to an individual one of the conductive bars 18. The conductive elements 13 of the display device 15 are similarly connected by a sheet of insulating material 19, constructed in the same manner as the sheet 16, to a commutator drum 20 having bars 21 in the same manner as the commutator drum 17. A brush 22 engages the bars 18 of the commutator drum 17 and is supported on an arm 23 for rotation by an electric motor drive 24 about the axis of the drum 17. A similar brush 25 and supporting arm 26 are driven, for rotation about the commutator drum 20, by step-down gearing 27 from the motor 24. A source of alternating potential 28 is connected through a brush and slip ring 29 to the arm 23 and brush 22, and is connected through contacts 30 and 31 and a brush and slip ring 32 to the arm 26 and brush 25. A perforated tape 33 has perforations defining an animated image to be reproduced by the display devices 15 and is moved by means, not shown, at constant velocity between the contacts 30 and 31 to open and close the contacts in accordance with the perforations of the tape 33.

In considering the operation of the display arrangement thus described, assume initially that the contacts 30 and 31 are closed and thus apply the voltage of the source 28 through the slip rings 29, 32, the brushes 22 and 25, and commutator drums 17 and 20 to successive ones of the conductive elements 11 and successive ones of the conductive elements 13 of the display device 15. Since the conductive elements 11 are connected to the source 28 in succession at a higher rate than are the elements 13, the spot of light produced between the elements 11 and 13 in the manner previously described scans rapidly from top to bottom of the display device 15 and more slowly from side to side of the latter thus scanning the display device in a raster of parallel lines. If this scanning action is rapid enough under control of the motor 24, persistence of vision of the human eye will give the impression of a uniformly illuminated display device. When now the perforated tape 33 is moved between the contacts 30 and 31, the lengths and spacings of the perforations of the tape may be so selected that an animated image will be produced by the display device 15 during succession scansions of the illuminated spot of light as it traverses the image reproducing area of the display device. The resultant image, of course, will be one of extreme contrast without half-tones or gradations of light intensity. Such an arrangement is useful in many forms of animated display devices used for advertising purposes.

Figure 4:
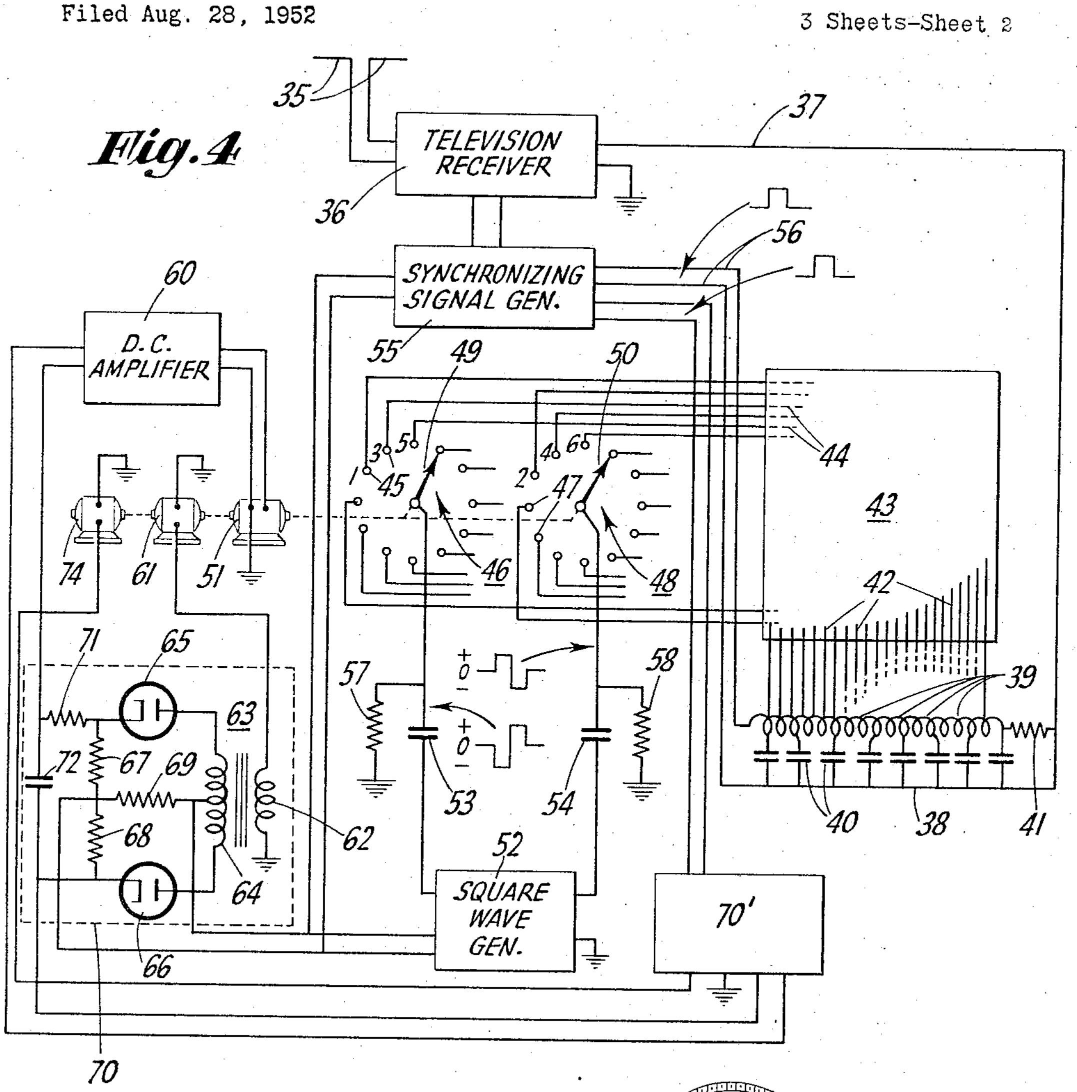
FIG. 4 is a circuit diagram, partly schematic, showing a television receiver utilizing a display device of the invention.

FIG. 4 is a circuit diagram, party schematic, representing a complete television receiver which uses a visual display device embodying the present invention for the reproduction of television images. The television receiver 36 has an input circuit connected to an antenna 35 and may include television signal selecting, amplifying and detecting stages in conventional manner. The television or video signal developed in the output circuit of the receiver 36 is applied through a conductor 37 to the low potential or ground terminal 38 of an electrical delay line. The latter is of conventional configuration having series connected inductors 39 and successive shunt-connected condensers 40 and is terminated by a resistor 41 having a value equal to the characteristic or surge impedance of the delay line. The vertically oriented conductive elements 42 of a display device 43 embodying the present invention are connected to individual equally spaced taps on the inductors 39 of the delay line. The horizontally positioned conductive elements 44 of the display device 43 are divided into two groups in which alternate elements are in one group and the intervening elements are in a second group. Elements of the first group are connected by conductors to individual contacts 45 of a commutator 46 whereas elements of the other group are connected to individual contacts 47 of a second commutator 48. The commutators 46 and 48 may have the construction described in connection with FIG. 3, and may be connected to the horizontally positioned elements 44 of the display device 43 in the same manner as described in FIG. 3. The commutators 46 and 48 have respective movable contacts 49, 50 which are mechanically driven in unison by an electric motor 51.

A generator 52 generates two voltages of symmetrical rectangular wave form but phase displaced by 180° with respect to each other. One of these voltages is applied through a condenser 53 and shunt-connected condenser 57 to the contactor 49 of the commutator 46 while the other voltage is applied through a condenser 54 and shunt-connected condenser 58 to the contactor 50 of the commutator 48. The generator 52 has its operation synchronized by the field synchronizing pulses of the received television signal, these pulses being separated from the television signal by a synchronizing signal separator 55 which is coupled to an output circuit of the television receiver 36. The line synchronizing pulses of the television signal also are separated from the television signal by the unit 55 and are applied through conductors 56 to the input terminals of the electrical delay line 39, 40.

The motor 51 is energized from the output circuit of a direct current amplifier 60 in order that the operation of the motor may be controlled in phase with the field synchronizing and line synchronizing pulses of the received television signal. To this end, the motor 51 drives an alternating current generator 61 the output terminals of which are connected to the primary 62 of a transformer 63. The secondary winding 64 of the transformer is center tapped and has its end terminals connected to the anode elements of a pair of diode rectifiers 65 and 66.

The cathodes of the rectifiers are connected to individual load resistors 67 and 68, and the juncture of the resistors is coupled through a resistor 69 of large value to the center tap of the secondary winding 64 of the transformer 63. The field synchronizing pulses developed in the output circuit of the synchronizing signal separator 55 are applied across the resistor 69. The elements 62 to 69, inclusive, comprise a conventional phase detector 70 which is coupled through a low pass filter comprising a series resistor 71 and a shunt condenser 72 to the input circuit of the direct current amplifier 60. A similar phase detector 70′, having the same construction and arrangement as the phase detector 70, is supplied with line synchronizing pulses from an output circuit of the synchronizing signal separator 55 and is also supplied with an alternating potential (having the same periodicity as the line synchronizing pulses) generated by a generator 74 which is driven by the motor 51. The control potential developed in the output circuit of the phase detector 70′ is applied to the input circuit of the direct current amplifier 60 in series with the control potential developed in the output circuit of the phase detector 70.

Considering now the operation of the television receiver just described, the line synchronizing pulses applied to the electrical delay line 39, 40 from the unit 55 travel down the delay line at a uniform velocity so that each applied pulse successively energizes the vertically positioned conductive elements 42 of the display device 43. Each pulse upon reaching the end of the delay line is absorbed by the resistor 44 to avoid reflection of the pulse back along the delay line. The voltage generated by the square wave generator 52 has a periodicity corresponding to the frame frequency of the received television signal, conventionally 30 cycles per second, and is applied by the commutator 46 in succession to alternate ones of the horizontally positioned conductive elements 44 of the display device 43. The phase displaced voltage also generated by the generator 52 is applied through the commutator 48 in succession to the intervening horizontally positioned conductive elements 44 of the display device 43. It will be recognized that during one-half cycle of the voltage supplied through the commutator 46 to its associated group of elements 44, the voltage has maximum potential difference with respect to a pulse voltage successively applied to the vertically positioned elements 42 of the display device. The amplitudes of these applied voltages is selected such that the display device 43 is energized to the light incipient region of its light output intensity characteristic, as was explained in connection with FIGS. 2*b* and 2*c*. It may also be noted that during such half cycle the voltage applied by the commutator 48 to its associated group of elements 44 has such polarity that the voltage difference between these elements and the elements 42 is much less than that required to bias the display device to the light incipient stage. The conditions last described are reversed on the second half cycle of the voltage of generator 52 so that the intervening horizontally positioned bars 44 of the display device 43 have maximum potential with respect to the vertically positioned elements 42 of the device thus again creating a light incipient condition between these energized elements.

A television or video signal developed in the output circuit of the receiver 36 is applied through the conductor 37 to the delay line 39, 40 in series with the pulse voltages last discussed and is effective to increase the potential between the elements 42 and 44 above the incipient condition and into the light producing region of the display device. This series relationship of the applied voltages will be apparent when it is considered that the voltage outputs of the generator 52 are developed across the resistors 57 and 58, so that resistors 57 and 58 considered as a voltage generator is serially connected from ground through selected ones of the elements 42 and 44 of device 43 and through the delay line 39, 40 (also considered as a pulse-voltage generator) and through the output of the receiver 36 to ground. It will be apparent that the amplitude of the television signal at any moment thus determines the light output of the display device 43 at that moment and consequently effectively modulates the spot of light as it scans across the image reproducing area of the display device by successive energizations of its conductive elements 44 and 42 in the manner earlier described. It is the purpose of the commutators 46 and 48 and the voltages supplied thereto from the generator 52 to cause successive ones of the television images to be interlaced in conventional manner.

Since the operation of the commutators 46 and 48 must be synchronized with the field and line synchronizing pulses of the received television signal, the reference alternating potential generated by the generator 61 and applied to the phase detector 70 is compared in the latter with the phase of the field synchronizing pulses which are applied to the phase detector from the separator unit 55. Further, the reference alternating potential of the generator 74 is likewise phase compared with the line synchronizing pulses in the phase detector 70'. The operation of these phase detectors is conventional and there is developed in the output circuit of the detectors individual control potentials which are applied in series to the input circuit of the direct current amplifier 60 to control in conventional manner the excitation of the motor 51 and thereby advance or retard its speed as necessary to provide the required synchronized operation.

Figure 5:
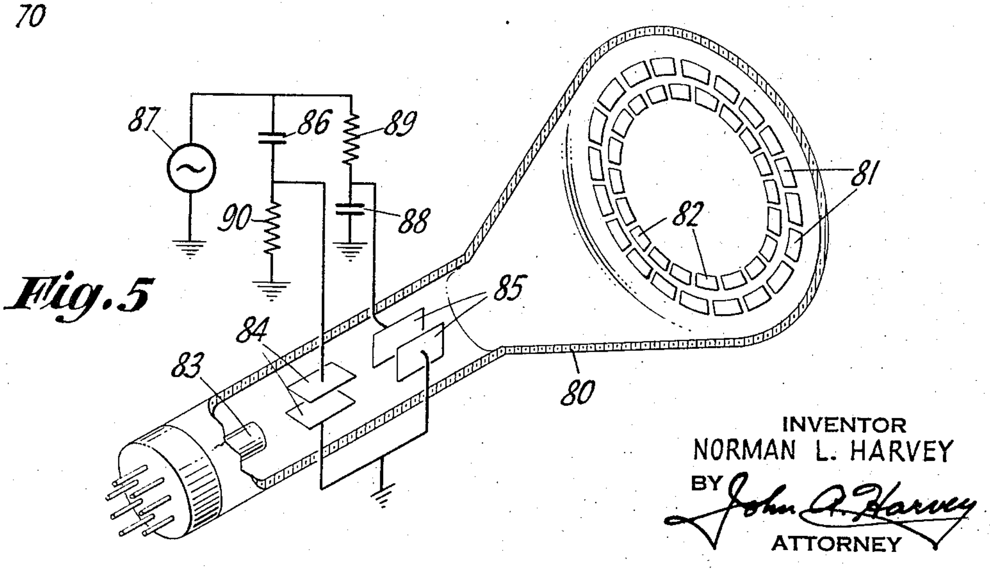
FIG. 5 represents a form of scanning generator suitable for use in the FIG. 4 arrangement.

FIG. 5 illustrates a commutator arrangement of the cathode-ray tube type which is suitable to replace the commutators 46 and 48 of the FIG. 4 receiver arrangement. In the FIG. 5 construction, a cathode-ray tube 80 has a target formed as a series of conductive segments 81, arranged in a circle of given radius, and also a second series of conductive segments 82 arranged in a circle of smaller radius but with the segments 82 evenly overlapping the segments 81. A conventional electron gun 83 directs a stream of electrons at the target, and a pair of deflecting electrodes 84 deflects the electron beam in one direction while a similar pair of deflecting electrodes 85 deflects the electron beam in a direction normal to the first direction. The electrodes 84 are energized from the voltage developed across a resistor 90 which is connected through a condenser 86 to a source of alternating potential 87. The electrodes 85 similarly are energized by the voltage developed across a condenser 88 which is connected through a resistor 89 to the source of potential 87. It will be appreciated that the values of the elements 86, 90 and 88, 89 are so selected that the voltages applied to the electrodes 84 is 90° phase displaced with relation to that applied to the electrodes 85 so that this energizing system for the electrodes 84 and 85 causes the electron beam of the cathode-ray tube 80 to trace a circular path on its target. The radius of the path varies with the amplitude of the potential of the source 87, and in practice, the source 87 is arranged to have one value of potential during one field interval of the television signal and to have either a smaller or larger value of potential as required during the successive field interval to cause the electron beam to make complete scansions of the conductive segments 81 and 82 in succession. The segments 81 and 82 are connected in the manner of the contacts 45 and 47 of the commutators 46 and 48 of the FIG. 4 arrangement to the conductive elements 44 of the display device 43.

FIG. 6 illustrates diagrammatically a modified form of visual display device embodying the invention. In this arrangement, a first array of conductive elements 91 are arranged in concentric circles and a second array of elements 92 are arranged to radiate from the center of the elements 91. It will be understood that a layer of electric-field-responsive light-emitting phosphor is positioned between these arrays in the manner of the FIG. 1 construction. By energizing the elements 91 rapidly in succession from the innermost element to the outermost element while at the same time energizing the elements 92 in succession but at a much lower rate, the scanning action of the display device is radially outward along an element 92 at a rapid rate and angularly successively from one element 92 to another at a slower rate. A display device embodying this modified form of the invention has utility, for example, as the reproducing device in a plan-position-indicator type of radar system. The operation of this modified form of construction is otherwise essentially similar to that described in connection with FIG. 1 and will not be repeated.

FIG. 7 illustrates in cross section a modified form of visual display device essentially similar to FIG. 1, similar elements being designated by similar reference numerals, except that a sheet of dielectric material 95 is positioned to overlay the conductive elements 13 and a sheet of conductive material 96 is placed on the opposite side of the dielectric material from the elements 13. The dielectric material 95 preferably has a substantial value of dielectric constant so that each element 13 forms a condenser with the conductor 96. This construction is suitable for use as the display device 43 of the FIG. 4 arrangement, the condensers 40 of the electrical delay line there shown then being comprised by the capacitance between each conductive element 13 and the conductive member 96 which then constitutes the common or ground terminal 38 of the delay line. With this construction, the inductors 39 of the delay line shown in the FIG. 4 arrangement may be formed by any of numerous well-known printed circuit or etched foil techniques upon the surface of the dielectric material 95 and between the conductive elements 13 thus combining the electrical delay line and display device into a unitary structure.

It will be apparent from the foregoing description of the invention that a visual display device embodying the invention is of simple and compact construction which does not require evacuation. Consequently, it occupies a minimum of physical volume, has a size dictated only by the size of the image reproducing area desired, and may be easily and readily handled and transported. At the same time, the display device is characterized by high efficiency of light translation from electrical energization and thus greatly minimizes the electrical excitation power for an image of given size and brightness. A visual display device embodying the invention may be constructed in many forms suitable for a wide range of applications.

While there have been described what are at present considered to be the preferred embodiments of the invention, it will be apparent to those skilled in the art that various changes and modifications may be made therein without departing from the invention. Consequently, the appended claims should be interpreted broadly, as may be consistent with the spirit and scope of the invention.

What I claim is:

1. A visual display device comprising, a first array of light-transmitting electrically-conductive electrically-individual elements, a second array of electrically-conductive electrically-individual elements in opposed relation to said first array but spaced therefrom, and a layer of electric-field-responsive light-emitting phosphor positioned between said arrays.

2. A visual display device comprising, a first array of light-transmitting electrically-conductive electrically-individual elements, a layer of electric-field-responsive light-emitting phosphor formed on said array in engagement therewith, and a second array of electrically-conductive electrically-individual elements formed on said phosphor in engaging relation therewith and in opposing relation to said first array.

3. A visual display device comprising, a rigid support member, a first array of electrically-conductive electrically-individual elements integral with said member and supported thereby, a second array of electrically-conductive electrically-individual elements in opposing relation to said first array but spaced therefrom, and a layer of electric-field-responsive light-emitting phosphor positioned between said arrays, the elements of one of said arrays being substantially transparent to light rays.

4. A visual display device comprising, a rigid light-transparent support member, a first array of light-transmitting electrically-conductive electrically-individual elements integral with said member and supported thereby, a second array of electrically-conductive electrically-individual elements in opposing relation to said first array but spaced therefrom, and a layer of electric-field-responsive light-emitting phosphor positioned between said arrays.

5. A visual display device comprising a laminar structure including in the order named a first array of light-transmitting electrically-conductive electrically-individual elements, a layer of electric-field responsive light-emitting phosphor, and a second array of electrically-conductive electrically-individual elements in opposing relation to said first array but spaced therefrom by the depth of said phosphor layer.

6. A visual display device comprising, a first array of light-transmitting electrically-conductive electrically-individual elements, a second array of electrically-conductive electrically-individual elements in opposing relation to said first array but spaced therefrom, and an electric-field-responsive light-emitting phosphor filling the space between said first and second arrays.

7. A visual display device comprising, a first grid structure of parallel elongated light-transmitting electrically-conductive electrically-individual elements, a second grid structure of parallel elongated electrically-conductive electrically-individual elements oriented normal to the elements of said first structure and positioned in opposing relation thereto but spaced therefrom, and a layer of electric-field-responsive light-emitting phosphor positioned between said grid structures.

8. A visual display device comprising, a rigid light-transparent supporting member, a first grid structure of parallel linear light-transmitting electrically-conductive electrically-individual elements integral with said member and supported thereby, a second grid structure of parallel linear electrically-conductive electrically-individual elements oriented normal to the elements of said first structure and positioned in opposing relation thereto but spaced therefrom, and electric-field-responsive light-emitting phosphor filling the space between the elements of said structures.

9. A visual display device comprising, a plurality of circular electrically-conductive electrically-individual elements positioned in concentric relation, a second array of linear electrically-conductive electrically-individual elements spaced from said first array and with each element of said second array radiating from the center of said first array, and a layer of electric-field-responsive light-emitting phosphor positioned between said arrays, the elements of one of said arrays being substantially transparent to light rays.

10. A visual display device comprising, a rigid transparent supporting member, a first array of light transmitting electrically-conductive electrically-individual elements integral with said member and supported thereby, a second array of electrically-conductive electrically-individual elements in opposing relation to said first array but spaced therefrom, and a layer of electric-field-responsive light-emitting phosphor positioned between said arrays, one of said arrays having the configuration of concentric rings and the other of said arrays having the configuration of linear elements each radiating from the center of said one array.

11. A visual display device comprising a laminar structure including in the order named a first array of electrically-conductive electrically-individual elements, a layer of electric-field-responsive light-emitting phosphor, a second array of electrically-conductive electrically-individual elements in opposing relation to said first array, a layer of dielectric material, and a conductive member extending along each of said last-mentioned elements in opposing relation thereto, all of the conductors on one side of said phosphor being substantially light transparent.

12. A visual display device comprising a laminar structure including in the order named a rigid transparent supporting member, a first array of light-transmitting electrically-conductive electrically-individual elements integral with said member and supported thereby, a layer of electric-field-responsive light-emitting phosphor formed on said first array in intimate contact therewith, a second array of electrically-conductive electrically-individual elements formed on said phosphor layer in opposing relation to said first array, a layer of dielectric material in engagement with said second array, and a sheet of conductive material contacting said dielectric material and in intimate engagement therewith along the lengths of the elements of said second array.

13. A phosphor screen comprising a first grid of spaced parallel conductors, a second grid of spaced parallel conductors in spaced electrically insulated relationship with said first grid, the conductors of said second grid running at substantially a right angle with the conductors of said first grid, means for selectively completing an electrical circuit through one end of said conductors and a phosphor positioned between said grids, said phosphor being zinc sulfide.

14. A phosphor screen comprising a first grid of spaced parallel conductors, a second grid of spaced parallel conductors in spaced electrically insulated relationship with said first grid, the conductors of said second grid running at substantially a right angle with the conductors of said first grid, means for selectively completing an electrical circuit through one end of said conductors and a phosphor layer positioned between said grids, said phosphor being zinc sulfide, wherein the electrical circuit completing means generates an electron flow through said phosphor.

15. A signal display system comprising, an image reproducing device including two arrays of electrically-individual electrically-conductive elements with the elements of one array positioned at an angle to those of the other and separated therefrom by an intervening layer of electric-field-responsive light-emitting phosphor, first scanning means for successively and repeatedly energizing the elements of one of said arrays with the repetition of energization occurring at a predetermined periodicity, second scanning means for successively and repeatedly energizing elements of the other of said arrays with the repetition of energization occurring at a second predetermined periodicity, and means for varying the electric field produced across said phosphor layer by said scanning means in accordance with a signal to be displayed by said device.

16. A television receiver comprising, an image reproducing device including two arrays of electrically-individual electrically-conductive elements with the elements of one array positioned normal to those of the other and separated therefrom by an intervening layer of electric-field-responsive light-emitting phosphor, means for successively and repeatedly energizing the elements of one of said arrays with the repetition of energization occurring at the line of periodicity of a received television signal, means for successively and repeatedly energizing the elements of the other of said arrays with the repetition of energization occurring at the frame periodicity of said received television signal, and means for additionally energizing all of the elements of one of said arrays in common with said received television signal.

17. A television receiver comprising, an image reproducing device including two arrays of electrically-individual electrically-conductive elements with the elements of one array positioned normal to those of the other and separated therefrom by an intervening layer of electric-field-responsive light-emitting phosphor, line scanning means for successively and repeatedly energizing the elements of one of said arrays with the repetition of energization occurring at the line periodicity of a received television signal, field scanning means for successively and repeatedly energizing elements of the other of said arrays with the repetition of energization occurring at the frame periodicity of said received television signal, and means for varying the electric field produced across said phosphor layer by said line and field scanning means in accordance with the video component of said received television signal.

18. A television receiver comprising an image reproducing device including two arrays of electrically-individual electrically-conductive elements with the elements of one array positioned normal to those of the other and separated therefrom by an intervening layer of electric-field-responsive light-emitting phosphor, line scanning means for successively and repeatedly energizing the elements of one of said arrays with the repetition of energization occurring at the line periodicity of a received television signal, field scanning means for successively and repeatedly energizing elements of the other of said arrays in interlaced groups of elements with the repetition of energization occurring at frame periodicity of said received television signal, and means for varying the electric field produced across said phosphor layer by said line and field scanning means in accordance with the video component of said received television signal.

19. A television receiver comprising, an image reproducing device including two arrays of electrically-individual electrically-conductive elements with the elements of one array positioned normal to those of the other and separated therefrom by an intervening layer of electric-field-responsive light-emitting phosphor, line scanning means for successively and repeatedly energizing the elements of one of said arrays with the repetition of energization occurring at the line periodicity of a received television signal, field scanning means for successively and repeatedly energizing elements of the other of said arrays with the repetition of energization occurring at the frame periodicity of said received television signal, the combined magnitudes of said energizations being selected to bring said phosphor to its light incipient condition, and means for varying the light-incipient electric field produced across said phosphor by said line and field scanning means in accordance with the video component of said received television signal.

20. A television receiver comprising, an image reproducing device including two arrays of electrically-individual electrically-conductive elements with the elements of one array positioned normal to those of the other and separated therefrom by an intervening layer of electric-field-responsive light-emitting phosphor, time delay means having a plurality of outputs connected to the elements of one of said arrays, means for supplying pulses corresponding to the horizontal synchronizing pulses of a received television signal to the input of said time delay means, field scanning means for successively and repeatedly energizing elements of the other of said arrays with the repetition of energization occurring at the frame periodicity of said received television signal, and means for varying the electric field produced across said phosphor layer by said time delay means and said scanning means in accordance with the video component of said received television signal.

21. A television picture producing device comprising, in combination: a first group of electrodes arranged in lines in a plane; a second group of electrodes arranged in lines substantially perpendicular to those of said first group in a plane generally parallel to said first plane, a layer of electroluminescent material positioned between said parallel planes; a source of television—picture modulated signal voltage; and means for applying said voltage across said electroluminescent material from electrodes of said first group to electrodes of said second group in a predetermined sequence forming a pattern.

22. A device as claimed in claim 21, characterized in that said voltage applying means comprises two commutators, one of said commutators being connected between one terminal of said signal source and said first group of electrodes, and the other of said commutators being connected between the other terminal of said signal source and said second group of electrodes.

23. A device as claimed in claim 21 characterized in that each line of the electrodes of at least one of said groups comprises a linear conductor.

24. A device as claimed in claim 22 characterized in that said source of signal voltage is subdivided into two sources, one connected to each of said commutators and further characterized in that a resistor is connected in series between each line of electrodes of at least one group of electrodes and a common junction electrically between said two voltage sources.

25. A device as claimed in claim 22 characterized in that at least one of said commutators is mechanical and comprises a plurality of contact segments and a brush arm cooperating sequentially therewith.

26. A device as claimed in claim 22 characterized in that one of said commutators comprises a delay line, the electrodes of one of said groups of electrodes being linear conductors and being connected to said delay line at points substantially equidistant therealong, said delay line being connected to a dissipating impedance at the end thereof remote from the source of signal voltage.

References Cited

UNITED STATES PATENTS

| | | | |
|---|---|---|---|
| 1,467,132 | 9/1923 | Bilstein | 250—80 X |
| 2,186,393 | 1/1940 | Ring et al. | 250—80 X |
| 2,239,887 | 4/1941 | Ferrant | 250—80 X |
| 2,416,056 | 2/1947 | Kalimann | 250—80 X |
| 2,577,038 | 12/1951 | Rose | 313—92.5 X |
| 2,624,857 | 1/1953 | Mager | 250—71 X |

JAMES W. LAWRENCE, *Primary Examiner.*

RALPH G. NILSON, E. JAMES SAX, NEWTON N. LOVEWELL, DAVID J. GALVIN, *Examiners.*

G. BARON, R. SEGAL, A. GAUSS, R. L. JUDD, *Assistant Examiners.*